US012609539B2

(12) United States Patent
Wang

(10) Patent No.: US 12,609,539 B2
(45) Date of Patent: Apr. 21, 2026

(54) SWITCH MODE PRE-CHARGE CIRCUIT

(71) Applicant: LG Energy Solution, Ltd., Seoul (KR)

(72) Inventor: Lilu Wang, Garland, TX (US)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 18/917,023

(22) Filed: Oct. 16, 2024

(65) Prior Publication Data

US 2026/0106464 A1     Apr. 16, 2026

(51) Int. Cl.
H02J 7/34 (2006.01)
H02J 7/00 (2006.01)
H02H 9/00 (2006.01)

(52) U.S. Cl.
CPC ........... H02J 7/345 (2013.01); H02J 7/0047 (2013.01); H02J 7/00711 (2020.01); H02H 9/001 (2013.01)

(58) Field of Classification Search
CPC ...... H02J 7/345; H02J 7/0047; H02J 7/00711; H02H 9/001
USPC ........................................................ 307/109
See application file for complete search history.

(56) References Cited

U.S. PATENT DOCUMENTS

2010/0308582 A1* 12/2010 Rozman .................. H02P 9/102
                                                      290/31
2023/0128816 A1   4/2023 Biebach
2025/0112493 A1*  4/2025 Tarmoom ................ B60L 1/003

FOREIGN PATENT DOCUMENTS

GB      2636797 A * 7/2025 ............. H02H 9/001
KR   2016-0024254 A   3/2016
KR   2017-0002298 A   1/2017
KR     20180040004 A   4/2018
KR     20210070077 A   6/2021
KR     20230011796 A   1/2023
KR   2023-0018721 A   2/2023
KR     20240145370 A   10/2024
WO     2023075164 A1   5/2023

OTHER PUBLICATIONS

W2024-SR01983 Search Report dated Mar. 13, 2024.
Search Report of the corresponding Application No. PCT/KR2025/012028 dated Nov. 7, 2025.

* cited by examiner

*Primary Examiner* — Richard Tan
(74) *Attorney, Agent, or Firm* — Harness, Dickey & Pierce, P.L.C.

(57) ABSTRACT

A switch mode control circuit, comprising a battery link configured to connect to a battery, a capacitor link configured to connect to a capacitor, and a pre-charge circuit connected in series between the battery link and the capacitor link configured to limit inrush current to the capacitor during initial power connection. The pre-charge circuit includes a switching mechanism configured to alternate between an open state and a closed state, a shunt resistor to monitor the current, and a controller operatively coupled to the switching mechanism configured to control a duty cycle of the switching mechanism. The controller dynamically adjusts the duty cycle of the switching mechanism by intermittently closing the switching mechanism until a predetermined voltage is achieved, and upon achieving the predetermined voltage, the controller maintains the switch in the closed state to enable continuous direct current flow from the battery to the capacitor.

20 Claims, 3 Drawing Sheets

SWITCH MODE PRE-CHARGE CIRCUIT

FIELD

The present disclosure relates generally to the field of battery disconnect units and more specifically to a switch mode pre-charge circuit.

BACKGROUND

This section provides background information related to the present disclosure which is not necessarily prior art.

In high-voltage electrical systems, e.g., electric vehicles, a large voltage differential between a load capacitor and a high-voltage battery may result in a significant inrush current upon connection. Such inrush current may damage the power relay and other downstream components. This issue is particularly critical in medium-to-large battery packs, such as those used in electric vehicles, where the sudden surge of current can lead to fusion or other forms of damage to the relay.

To mitigate the effects of inrush current, conventional systems often employ a pre-charge relay and pre-charge resistor connected in parallel with the main power relay. In electric vehicles, the pre-charge relay and pre-charge resistor initially conducts electric power to the motor, allowing the current to stabilize before the main relay fully connects the battery to the motor. While this approach can prevent damage to the power relay, the inrush current may exceed the power rating of the pre-charge resistor resulting in micro-damage or micro-welding which may increase the resistance of pre-charge resistor over time.

The present invention addresses these issues by introducing a switch mode control circuit for limiting inrush current.

SUMMARY

This section provides a general summary of the disclosure, and is not a comprehensive disclosure of its full scope or all of its features. Each of the examples disclosed herein may include one or more of the features described in connection with any of the other disclosed examples.

The present disclosure provides a switch mode control circuit, including a battery link configured to connect to a battery for supplying electrical power, a capacitor link configured to connect to a capacitor for receiving the electrical power from the battery, a pre-charge circuit connected in series between the battery link and the capacitor link, wherein the pre-charge circuit is configured to limit inrush current to the capacitor during initial power connection, wherein the pre-charge circuit includes a switching mechanism configured to alternate between an open state and a closed state, a shunt resistor to monitor the current, a controller operatively coupled to the switching mechanism, wherein the controller is configured to control a duty cycle of the switching mechanism, and wherein the controller dynamically adjusts the duty cycle of the switching mechanism to transition from the open state to the closed state by intermittently closing the switching mechanism during a stabilization period until a predetermined voltage is achieved, and upon achieving the predetermined voltage, the controller maintains the switch in the closed state to enable continuous direct current flow from the battery to the capacitor.

According to an aspect of the present disclosure, the pre-charge circuit is connected to a negative terminal of the battery link.

According to a further aspect of the present disclosure, the controller dynamically adjusts the duty cycle using Pulse Width Modulation.

According to a further aspect of the present disclosure, dynamically adjusting the duty cycle includes varying a frequency of the Pulse Width Modulation.

According to a further aspect of the present disclosure, the controller dynamically adjusts the duty cycle in real time based on the current from the capacitor link, an output voltage from the capacitor link, and a current measured at battery negative terminal through the pre-charge circuit.

According to a further aspect of the present disclosure, the switching mechanism is one or more MOSFETs or other solid state switch.

According to a further aspect of the present disclosure, the pre-charge circuit is further configured to monitor for at least one of an open circuit, an overload, and a short circuit.

According to a further aspect of the present disclosure, the predetermined voltage is approximately 0 volts.

According to a further aspect of the present disclosure, upon achieving the predetermined voltage, the controller maintains the switch in the closed state to enable continuous direct current flow from the battery to the capacitor until the capacitor is completely charged.

According to another aspect of the present disclosure, a switch mode control system including a battery configured to supply electrical power, a capacitor configured to receive the electrical power from the battery, a pre-charge circuit connected in series between the battery and the capacitor, wherein the pre-charge circuit is configured to limit inrush current to the capacitor upon initial connection of the battery, wherein the pre-charge circuit includes a switching mechanism configured to alternate between an open state and a closed state, a controller operatively coupled to the switching mechanism, wherein the controller is configured to control a duty cycle of the switching mechanism, and wherein the controller dynamically adjusts the duty cycle of the switching mechanism to transition from the open state to the closed state by intermittently closing the switching mechanism during a stabilization period until a predetermined voltage is achieved, and upon achieving the predetermined voltage, the controller maintains the switch in the closed state to enable continuous direct current flow from the battery to the capacitor.

According to a further aspect of the present disclosure, the pre-charge circuit is connected to a negative terminal of the battery.

According to a further aspect of the present disclosure, the controller dynamically adjusts the duty cycle using Pulse Width Modulation.

According to a further aspect of the present disclosure, dynamically adjusting the duty cycle includes varying a frequency of the Pulse Width Modulation.

According to a further aspect of the present disclosure, the controller dynamically adjusts the duty cycle in real time based on the current from the capacitor, an output voltage from the capacitor, and a current measured at battery negative terminal through the pre-charge circuit.

According to a further aspect of the present disclosure, the switching mechanism is one or more MOSFETs or other solid state switch.

According to a further aspect of the present disclosure, the pre-charge circuit is further configured to monitor for at least one of an open circuit, an overload, and a short circuit.

According to a further aspect of the present disclosure, the predetermined voltage is approximately 0 volts.

According to a further aspect of the present disclosure, upon achieving the predetermined voltage, the controller maintains the switch in the closed state to enable continuous direct current flow from the battery to the capacitor until the capacitor is completely charged.

According to another aspect of the present disclosure, a switch mode control circuit, including a battery link (LINK+) configured to connect between a battery for supplying electrical power, a capacitor link (LINK−) configured to connect to a capacitor for receiving the electrical power from the battery, a pre-charge circuit connected in series between the battery link and the capacitor link, wherein the pre-charge circuit is configured to limit an inrush current to the capacitor during initial power connection, wherein the pre-charge circuit includes a switching mechanism configured to alternate between an open state and a closed state, a shunt resistor to battery negative (PACK−) to monitor a current flow, a controller operatively coupled to the switching mechanism, wherein the controller is configured to control a duty cycle of the switching mechanism, and wherein the controller dynamically adjusts the duty cycle of the switching mechanism to transition from the open state to the closed state by intermittently closing the switching mechanism during a stabilization period until a predetermined voltage is achieved, and upon achieving the predetermined voltage, the controller maintains the switch in the closed state to enable continuous direct current flow from the battery to the capacitor until the capacitor is completely charged.

According to a further aspect of the present disclosure, the controller dynamically adjusts the duty cycle in real time based on a current from the capacitor link, an output voltage from the capacitor link, and a current measured at battery negative terminal through the pre-charge circuit.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
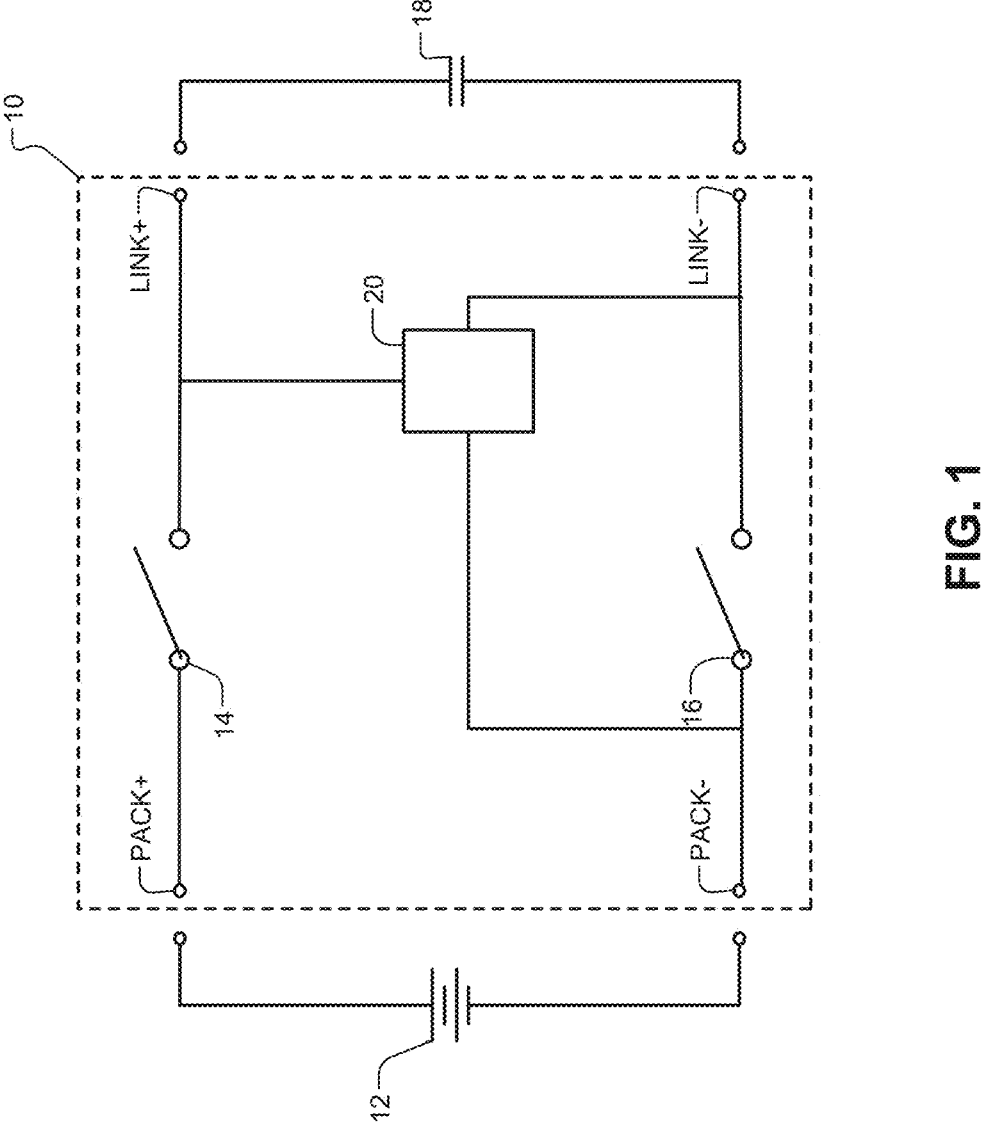
FIG. 1 is a block circuit diagram of an example embodiment of a battery disconnect unit including a switch mode pre-charge circuit.

Example embodiments will now be described more fully with reference to the accompanying drawings. Wherever possible, the same or similar reference numbers will be used throughout the drawings to refer to the same or like parts. Embodiments of the disclosure may solve one or more of the limitations in the art. The scope of the disclosure, however, is defined by the attached claims and not the ability to solve a specific problem.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this disclosure, relative terms, such as, for example, "about," "substantially," "generally," and "approximately" are used to indicate a possible variation of ±10% in a stated value or characteristic.

During the startup phase of an electric vehicle, inrush current may damage high voltage relays, or contactors, and downstream components of the high voltage power control system. A switch mode pre-charge circuit 20 according to the present disclosure dynamically controls the flow of current through the pre-charge circuit 20 to avoid damaging the high voltage relays and downstream components of the high voltage power control system.

FIG. 1 illustrates a battery disconnect unit 10 according to an example embodiment of the present disclosure. The battery disconnect unit 10 may include a positive terminal labeled as PACK+ and a negative terminal labeled as PACK−. The PACK+ terminal may electrically couple to a positive terminal of a battery pack 12 and the PACK− terminal may electrically couple to a negative terminal of the battery pack 12. The PACK+ terminal may also connect to a main positive relay 14 through a conductor, while the PACK− terminal may also connect to a main negative relay 16 through a separate conductor.

The main positive relay 14 connects the PACK+ terminal to a LINK+ terminal and the main negative relay 16 connects the PACK−terminal to a LINK−terminal. The relays 14, 16 may include a switch controlled by the battery disconnect unit 10 that can open or close the connection between the battery pack 12 and a capacitor 18, thereby controlling the flow of current. When the main positive relay 14 and main negative relay 16 are in the open position current may not flow between the battery pack 12 and the capacitor 18. When the main positive relay 14 is in the closed position and main negative relay 16 is in the open position current may flow between the battery pack 12 and the capacitor 18 through the switch mode pre-charge circuit 20, discussed further in FIG. 2.

In some embodiments, either the main positive relay 14, the main negative relay 16, or both may further include a fuse (not shown) positioned at the relay. The fuse may provide additional overcurrent protection to circuit components.

The battery disconnect unit 10 may further include a switch mode pre-charge circuit 20 connected to the LINK+, LINK−, and PACK− terminals. The switch mode pre-charge circuit 20 is discussed further below.

Figure 2:
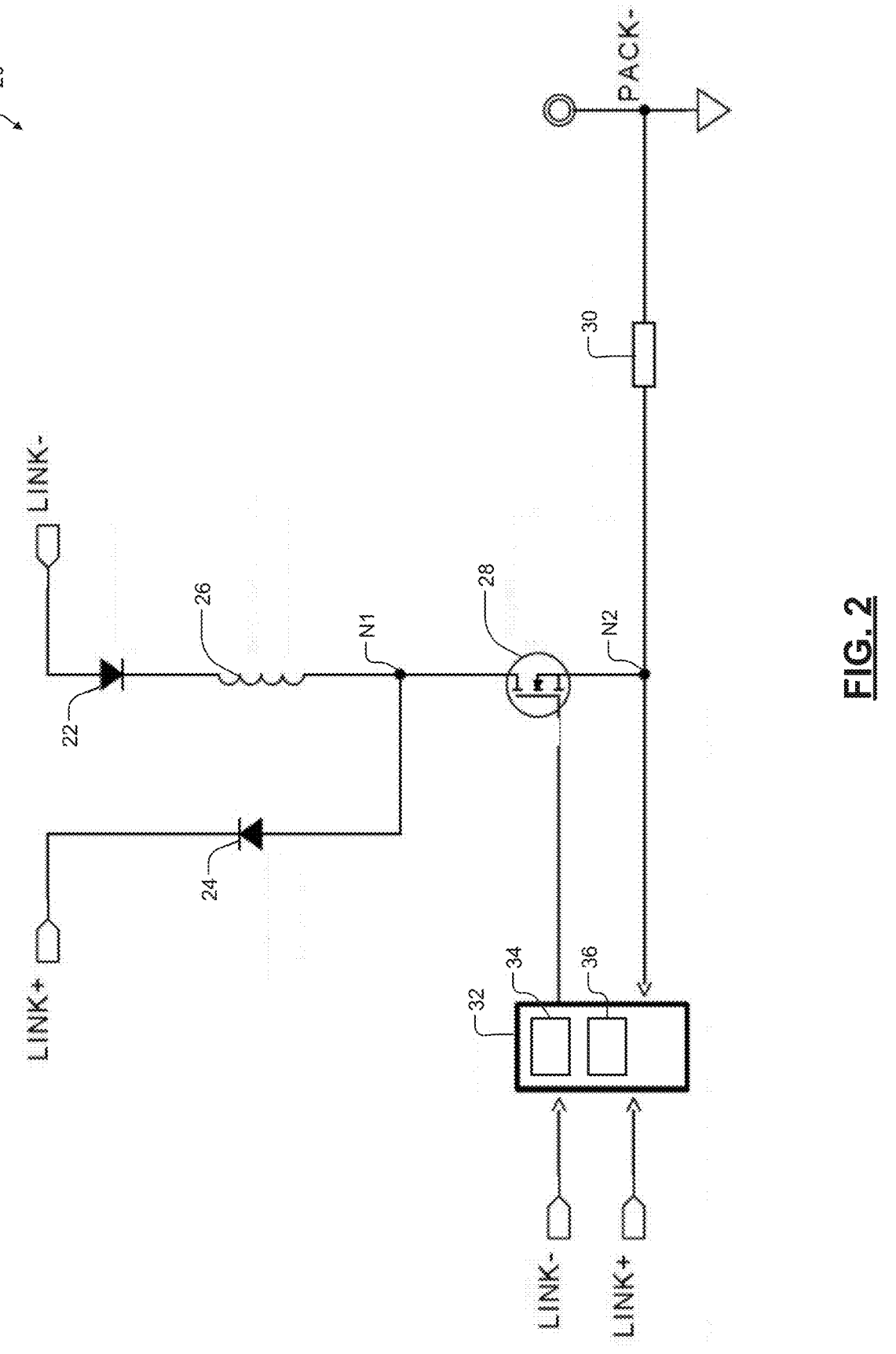
FIG. 2 is a circuit diagram of an example embodiment of a switch mode pre-charge circuit.

FIG. 2 illustrates the switch mode pre-charge circuit 20 of FIG. 1 according to an example embodiment of the present disclosure. The switch mode pre-charge circuit 20 may include a first diode 22, a second diode 24, an inductor 26, a switch 28, a shunt resistor 30, and a switching controller 32.

The cathode of the second diode 24 may be connected to LINK+. The anode of the second diode 24 may be connected to a node N1 between the inductor 26 and the switch 28. In this orientation, the second diode 24 allows current to flow from the inductor 26 to LINK+ when the switch 28 is in the OFF position, while preventing reverse current from LINK+ and flyback voltage spikes. The inductor 26 may be further connected to the cathode of the first diode 22. The first diode 22 and second diode 24 may be any suitable diode used in electrical circuits, including, but not limited to, silicon diodes, germanium diodes, or Schottky diodes. In some embodiments, the first diode 22 and second diode 24 may be any semiconductor device or circuit configured to operate as a one-way switch to control the flow of current.

The inductor 26 may be connected between the cathode of the first diode 22 and the node N1 between the second diode 24 and the switch 28. In this position, the inductor 26 may smooth out current fluctuations and store energy to gradually charge the capacitor 18. The anode of the first diode 22 may be connected to LINK−. In this orientation, the first diode 22 may allow current to flow from LINK− to the inductor 26.

The switch 28 may limit the current through the pre-charge circuit 20 by opening or closing in response to a signal from the switching controller 32, discussed in greater detail below. The source of the switch 28 may be connected to node N2, the shunt resistor 30, and, through the shunt resistor 30, to PACK−. The gate of the switch 28 may be connected to the switching controller 32. The drain of the switch 28 may be connected to the node N1 between the second diode 24 and the inductor 26. The switch 28 may include any suitable switching element, such as a MOSFET, having a source, a drain, and a gate, including other solid state switching elements.

The shunt resistor 30 may be connected between PACK− and node N2 between the source of the switch 28 and the switching controller 32. The shunt resistor 30 may be used by the switching controller 32 to measure the current flowing through the pre-charge circuit 20 at PACK−. The switching controller 32 may measure the voltage drop across the shunt resistor 30 to determine the current and adjust the duty cycle and frequency of the switch 28 based on the determined current, discussed further below. The shunt resistor 30 may include any semiconductor having a resistance and suitable for current measurement.

The switching controller 32 may be operably connected to the switch 28 and receive input signals from LINK+, LINK−, and PACK−. The input signals may include voltage measurements, current measurements, or both. In some embodiments, the switching controller 32 may include an analog-to-digital converter (ADC) 34 and voltage divider 36. The ADC 34 may be configured to convert the analog voltage measurements and analog current measurements into digital signals that the switching controller 32 may use for further calculation. The voltage divider 36 may be configured to step down the voltage measurements to a level suitable for input by the ADC 34, e.g. 5V.

The switching controller 32 may receive feedback from the shunt resistor 30, discussed further below, regarding the current flow through the pre-charge circuit 20 at PACK−. In some embodiments, the switching controller 32 may measure the voltage drop across the shunt resistor 30 to determine the current at PACK− using the ADC 34 and Ohm's Law ($V=I*R$). In other embodiments, the switching controller 32 may also determine the current flow through the pre-charge circuit 20 by measuring the current at LINK+ and/or LINK−.

The switching controller 32 may open or close the switch 28 in response to a current flow through the pre-charge circuit 20. Based on the voltage measurements from LINK+ and LINK− and the current measurements from PACK−, the pre-charge circuit 20 may calculate a duty cycle and a switching frequency. The duty cycle and switching frequency are key parameters that determine the operation of the switch 28. The duty cycle refers to the proportion of one period in which a signal or system is active, while switching frequency refers to the rate at which the switches are turned on and off. By adjusting these parameters, the pre-charge circuit 20 can effectively regulate the current flow for pre-charging the capacitor 18. In some embodiments, the switching frequency may be determined by the voltage measured at LINK+ and LINK− and the duty cycle may be determined by the current measured at PACK−.

The switching controller 32 may make real-time adjustments to the duty cycle and frequency of the switch 28 based on the current flow through the pre-charge circuit 20 and the output voltage. The output voltage may be determined by the switching controller 32 based on the voltage levels detected at LINK+ and/or LINK−. To determine the voltage, the switching controller 32 may step down the voltage input from LINK+ and LINK− to below 5V. In some embodiments, the switching controller 32 may dynamically adjust the duty cycle and frequency of the switch 28 using Pulse Width Modulation (PWM) or similar control methods. By controlling the current flow through the pre-charge circuit 20 in this manner, the switching controller 32 effectuates a gradual increase in current and prevents surges in inrush current that may damage circuit components. In other embodiments, the switching controller 32 may make real-time adjustments to the duty cycle and frequency of the switch 28 based on a current measured at LINK+ and/or LINK−, an output voltage measured at LINK+ and/or LINK−, and a current measured at PACK−.

The switching controller 32 may be configured to perform various diagnostic and protection functions. The switching controller 32 may perform diagnostic checks based on the measurements received from LINK+, LINK−, and the shunt resistor 30, in addition to timing information related to those measurements. The switching controller 32 may verify the integrity of the pre-charge circuit 20 by checking for open circuits, short circuits, overload conditions, or other self-protecting diagnostic functions. If an anomaly is detected, the switching controller 32 may perform a suitable error handling routine to resolve the anomaly. In some embodiments, the switching controller 32 may, upon detection of an anomaly, stop the pre-charge process to prevent further damage and issue a fault signal or an alert for maintenance. In other embodiments, the switching controller 32 may disconnect the pre-charge circuit 20 to prevent damage to other system components. The switching controller 32 may also log the anomaly and disable further charging until the anomaly is resolved.

Figure 3:
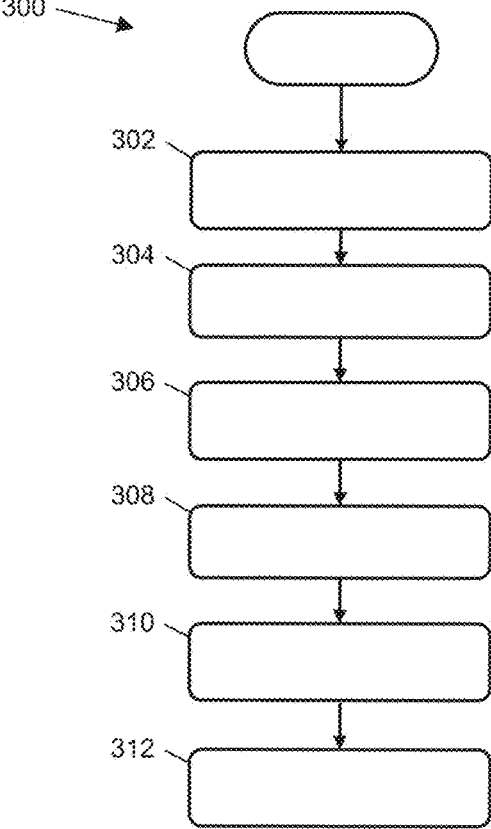
FIG. 3 is a flowchart of a process for controlling inrush current according to an example embodiment of a switch mode pre-charge circuit.

FIG. 3 illustrates the process 300 for controlling inrush current in a high voltage power system using a switch mode pre-charge circuit 20 according to an example embodiment of the present disclosure. In the example embodiment, the high voltage power system may operate at 400 volts. In other embodiments, the high voltage power system may include systems operating at 300, 500, or 800 volts, or at a select voltage or voltage range between 300 and 800 volts.

At 302, the main positive relay 14 is closed by the battery disconnect unit 10 to begin the pre-charge process. The main negative relay 16 remains open.

At 304, the switching controller 32 of the pre-charge circuit 20 may be powered by a pre-charge voltage at LINK+. At this step, the pre-charge voltage may be at the battery pack voltage of 400 volts. The switching controller 32 may receive input signals from the LINK+, LINK−, and shunt resistor 30, which may include voltage and current measurements.

At 306, the switching controller 32 may initialize the switch 28 and begin to dynamically adjust the frequency and duty cycle of the switch 28 using PWM. The switching controller 32 may incrementally increase the duty cycle, allowing the switch 28 to close intermittently. This step marks the start of the pre-charge phase, where small increments of current begin to flow through the pre-charge circuit 20.

At 308, the current flow through the shunt resistor 30 is continuously monitored by the switching controller 32. The voltage drop across the shunt resistor 30 is proportional to the current, providing real-time feedback to the switching controller 32. The switching controller 32 may use this feedback to adjust the duty cycle of the switch 28 dynamically, ensuring that the current increases smoothly and gradually.

At 310, upon LINK-reaching a first predetermined voltage level, the battery disconnect unit 10 closes the main negative relay 16. In some embodiments, the first predetermined voltage level may be at or near 5 volts.

At 312, the switching controller 32 continues to adjust the switch 28 duty cycle until LINK-reaches a second predetermined voltage level. The second predetermined voltage may be chosen to ensure that the capacitor is sufficiently charged without experiencing a sudden inrush of current. In some embodiments, the second predetermined voltage level may be at or near 0 volts, a range from 0 volts to <1 volt. Once the capacitor 18 reaches the second predetermined voltage, in step 312, the switching controller 32 may maintain the switch 28 in a closed state, allowing continuous direct current flow from the battery pack 12 to the capacitor 18. This ensures that the capacitor 18 is fully charged, completing the pre-charge phase.

The above description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A switch mode control circuit, comprising:

a battery link configured to connect to a battery for supplying electrical power, the battery having a voltage between 400V and 800V;

a capacitor link configured to connect to a capacitor for receiving the electrical power from the battery; and a pre-charge circuit connected in series between the battery link and the capacitor link, wherein the pre-charge circuit is configured to limit inrush current to the capacitor during initial power connection;

wherein the pre-charge circuit includes:

a switching mechanism configured to alternate between an open state and a closed state;

a shunt resistor disposed between a negative terminal of the battery and the switching mechanism to monitor a current; and a controller operatively coupled to the switching mechanism, wherein the controller is configured to control a duty cycle of the switching mechanism, wherein the controller dynamically adjusts the duty cycle of the switching mechanism to transition from the open state to the closed state by intermittently closing the switching mechanism during a stabilization period until the voltage on the pre-charge circuit is reduced from an initial voltage of between 400V and 800V to a predetermined voltage of between 0V and 5V, and upon achieving the predetermined voltage, the controller maintains the switching mechanism in the closed state to enable continuous direct current flow from the battery to the capacitor.

2. The switch mode control circuit of claim 1, wherein the controller dynamically adjusts the duty cycle using Pulse Width Modulation.

3. The switch mode control circuit of claim 2, wherein dynamically adjusting the duty cycle includes varying a frequency of the Pulse Width Modulation.

4. The switch mode control circuit of claim 1, wherein the controller dynamically adjusts the duty cycle in real time based on a current from the capacitor link, an output voltage from the capacitor link, and a current measured at battery negative terminal through the pre-charge circuit.

5. The switch mode control circuit of claim 1, wherein the switching mechanism is one or more MOSFETs or other solid state switch.

6. The switch mode control circuit of claim 1, wherein the pre-charge circuit is further configured to monitor for at least one of an open circuit, an overload, and a short circuit.

7. The switch mode control circuit of claim 1, wherein upon achieving the predetermined voltage, the controller maintains the switching mechanism in the closed state to enable continuous direct current flow from the battery to the capacitor until the capacitor is completely charged.

8. The switch mode control circuit of claim 1, wherein controller stores diagnostic data corresponding to detected anomalies.

9. The switch mode control circuit of claim 1, wherein controller determines a fault condition when a timing difference between voltage and current responses at link terminals to the capacitor exceeds a predetermined threshold.

10. A switch mode control system comprising:

a battery configured to supply electrical power, the battery having a voltage between 400V and 800V;

a capacitor configured to receive the electrical power from the battery; and a pre-charge circuit connected in series between the battery and the capacitor, wherein the pre-charge circuit is configured to limit inrush current to the capacitor upon initial connection of the battery;

wherein the pre-charge circuit includes:

a switching mechanism configured to alternate between an open state and a closed state;

a shunt resistor disposed between a negative terminal of the battery and the switching mechanism to monitor a current; and a controller operatively coupled to the switching mechanism, wherein the controller is configured to control a duty cycle of the switching mechanism, wherein the controller dynamically adjusts the duty cycle of the switching mechanism to transition from the open state to the closed state by intermittently closing the switching mechanism during a stabilization period until the voltage on the pre-charge circuit is reduced from an initial voltage of between 400V and 800V to a predetermined voltage of between 0V and 5V, and upon achieving the predetermined voltage, the controller maintains the switching mechanism in the closed state to enable continuous direct current flow from the battery to the capacitor.

11. The switch mode control system of claim 10, wherein the controller dynamically adjusts the duty cycle using Pulse Width Modulation.

12. The switch mode control system of claim 11, wherein dynamically adjusting the duty cycle includes varying a frequency of the Pulse Width Modulation.

13. The switch mode control system of claim 10, wherein the controller dynamically adjusts the duty cycle in real time based on a current from the capacitor, an output voltage from the capacitor, and a current measured at a battery negative terminal through the pre-charge circuit.

14. The switch mode control system of claim 10, wherein the switching mechanism is one or more MOSFETs or other solid state switch.

15. The switch mode control system of claim 10, wherein the pre-charge circuit is further configured to monitor for at least one of an open circuit, an overload, and a short circuit.

16. The switch mode control system of claim 10, wherein upon achieving the predetermined voltage, the controller maintains the switching mechanism in the closed state to enable continuous direct current flow from the battery to the capacitor until the capacitor is completely charged.

17. The switch mode control system of claim 10, wherein the controller stores diagnostic data corresponding to detected anomalies.

18. The switch mode control system of claim 10, wherein the controller determines a fault condition when a timing difference between voltage and current responses at link terminals to the capacitor exceeds a predetermined threshold.

19. A method for controlling a switch mode control circuit having a pre-charge circuit connected in series between a battery and a capacitor, the method comprising:

initiating pre-charge of the capacitor by closing a first switch disposed between a positive terminal of the battery and a positive terminal of the capacitor, wherein closing the first switch causes an initial voltage on the pre-charge circuit equal to a voltage of the battery;

adjusting, in response to the closing of the first switch, a duty cycle of a switching mechanism in the pre-charge circuit based on a current from the capacitor, an output voltage from the capacitor, and a current measured from a negative terminal of the battery such that a voltage on the pre-charge circuit decreases and a current on the pre-charge circuit increases gradually;

upon the voltage on the pre-charge circuit reaching 5V and while continuing to adjust the duty cycle of the switching mechanism, closing a second switch disposed between the negative terminal of the battery and a negative terminal of the capacitor; and upon the voltage on the pre-charge circuit reaching between 0V and 1V, maintaining the switching mechanism in a closed state allowing continuous direct current flow from the battery to the capacitor.

20. The method of claim 19, wherein the pre-charge circuit is further configured to monitor for at least one of an open circuit, an overload, and a short circuit.

* * * * *